United States Patent [19]

Prest, Jr.

[11] 4,373,065

[45] Feb. 8, 1983

[54] OPTICALLY ISOTROPIC DEVICES

[75] Inventor: William M. Prest, Jr., Rochester, N.Y.

[73] Assignee: Xerox Corporation, Stamford, Conn.

[21] Appl. No.: 235,311

[22] Filed: Feb. 17, 1981

[51] Int. Cl.³ .......................... C08L 25/06; G02B 3/00
[52] U.S. Cl. ...................................... 525/132; 264/1.1; 264/1.7; 350/DIG. 1; 430/32; 430/270; 430/945
[58] Field of Search .................. 525/132; 264/1.1, 1.7; 430/945, 32, 270; 350/DIG. 1

[56] References Cited

U.S. PATENT DOCUMENTS 3,383,435  8/1967  Cizek .................................. 260/874

OTHER PUBLICATIONS

Journal of Polymer Science, vol. 10, Part A—2, No. 7, Jul., 1972, pp. 1639-1655.

*Primary Examiner*—Wilbert J. Briggs, Sr.

[57] ABSTRACT

An optically isotropic device or component made of an optically isotropic polymeric material which is a blend of two completely miscible polymers which have opposite optical anisotropies. The blend has zero birefringence which is not substantially affected by processing of the blend into the optical device or component.

5 Claims, No Drawings

OPTICALLY ISOTROPIC DEVICES

BACKGROUND OF THE INVENTION

This invention relates to optically isotropic devices or components, and more particularly to optically isotropic devices or components made of an optically isotropic polymeric material which is a blend of at least two completely miscible polymers.

By the term "optically isotropic", it is intended to refer to the properties in certain materials that their optical properties are the same in all directions. Optically, such properties include the index of refraction and light absorption. Very few materials are optically isotropic. Few, if any molded organic polymeric materials are optically isotropic. Such transparent or partially transparent polymers as polyethylene, Lucite (trademark of the duPont Company), polymethylmethacrylate (PMMA), etc., are not, strictly speaking, optically isotropic. This may be seen by making a relatively thin layered sample of the polymeric material and then determine its birefringence and absorption of polarized light. Birefringence of the sample is determined by finding the indices of refraction of the sample for polarized light in one direction and that for polarized light in a direction perpendicular to the first direction. The difference in the two indices of refraction is the birefringence of the sample material. In an optically isotropic material, birefringence should be zero. In measuring the light absorption of the sample, the two polarized lights are passed through the sample and the difference in the sample's absorption of the two polarized lights is a measure of the anisotropic nature of the sample material. Moreover, even when a polymeric material has zero birefringence in its bulk state, the processing of such a material into a device, such as by extrusion or injection molding, would place stress on the material in the direction of flow. Such mechanical stress would induce orientation of the polymer molecules which almost always results in induced birefringence.

In certain optical devices, such as optical disks used in the recording and the retrieving of information thereon, it is required that the materials forming various layers therein be optically isotropic. Accordingly, there is a need for optical devices or components of optical devices which are optically isotropic.

It is, therefore, an object of the present invention to provide optically isotropic device and components of such devices.

It is a further object of the present invention to provide optical devices and components of such devices which retain their optical isotropic characteristics even after mechanical stresses have been placed on the polymeric material to orient the molecules therein.

These and other objects of the invention will be apparent from the following detailed disclosure.

PRIOR ART STATEMENT

Cizek U.S. Pat. No. 3,383,435 discloses a thermoplastic composition which comprises a polyphenylene ether and a styrene resin. The two polymers are said to be combinable in all proportions. The resultant composition exhibits improved mechanical and chemical properties such as increased resistance to organic solvents, increased hardness, and increased mechanical strength.

Prest, W. M., Jr. and Porter, R. S., *Rheological Properties of Poly(2,6-dimethylphenylene Oxide)-Polystyrene Blends*, J. Polymer Sci. 10 (Part A-2); pages 1639–1655, 1972. This article discussed the rheological properties of mixtures or blends of poly 2,6-dimethyl phenylene oxide (PPO) and polystyrene (PS). The article concluded that the PPO-PS system forms a rheologically compatible blend.

SUMMARY OF THE INVENTION

The above objects are accomplished in accordance with the present invention by making an optically isotropic device or component with an optically isotropic polymeric material. The optically isotropic polymeric material is a blend of at least two polymers which have opposite optical anisotropies and which are completely miscible at least over a range of proportions. Furthermore, the molecules in such a blend must orient proportionally in response to an applied stress. The blend has a substantially zero birefringence which is not substantially changed when the blend is processed into the optical device or components.

DETAILED DESCRIPTION OF THE INVENTION

As indicated above, in many optical devices it is important that optical clarity and uniformity be achieved. For example, in such uses as optical disks for information storage and lenses, optical clarity and uniformity are basic requirements of the devices. Although glass of various compositions are frequently used in optical devices, it is sometimes necessary or desirable to use organic polymeric materials in optical devices. In such a situation, care must be taken to insure that optical anisotropies are not introduced through either the nature of the optical polymers employed or through the processing of polymers.

Although optical anisotropies may originate with the nature of the materials employed, this problem is usually avoided by the choice of a proper material. Thus, when a material does not have the proper optical properties while in its bulk state, other materials will be chosen. However, it is more difficult to avoid optical anisotropies which may be introduced through the processing of the materials. For example, in injection molding or casting processes, or in practially any other shape-forming processes, stress must be placed on the polymeric materials to force them to flow or to conform to the shape of the mold. Such stresses are directional in nature and it had the effect of orienting the long molecules of the polymer in the direction of the applied stress. It is believed that the observed optical birefringence in optical devices and components made of polymeric materials is due to the orientation of the molecules during the manufacturing process. For the purposes of the present invention, such optical birefringence may be thought of as the difference in the indices of refraction of the optical device when subjected to light sources that have been polarized in different directions. One solution to this optical anisotropic problem caused by stressing and orientation of the polymer molecular chains is to hold the devices in the mold until the internal stresses relax. However, this approach will drastically increase the manufacturing cycle time, and it will also partially or totally negate the improvements in the mechanical properties in the polymer due to the applied stress and orientation of the molecular chains. It is, accordingly, desirable to have an optically isotropic device whose lack of birefringence is not substantially changed by manufacturing and other processing steps.

In accordance with the present invention, there is provided optically isotropic devices which are made of an optically isotropic polymeric material which is a blend of at least two polymers. The two polymers being completely miscible in the proportional ranges desired, and they have opposite optical anisotropies so that zero birefringence may be obtained in the blend at certain relative proportions. In addition, it is required that the zero birefringence of the blend be not substantially affected by the process of the blend into optical devices or components. In other words, the zero birefringence of the blend in its bulk state should not be altered by the application of stress or the orientation of the molecular species during various manufacturing steps. In a specific embodiment of the present invention, optically isotropic devices and components are made of a blend of a polyphenylene ether and a polystyrene, said blend containing about 34 to 40 percent by weight the polyphenylene ether and about 66 to 60 percent by weight the polystyrene, depending on the molecular weight of each polymer.

Although it was known that certain polyphenylene ethers and polystyrene are completely miscible, or are combinable in all proportions, and that such mixtures have certain improved mechanical properties, it was not known that specific mixtures of a polyphenylene ether and a polystyrene would be optically isotropic, and it was not known that the zero birefringence of such a specific blend would be relatively unaffected by stresses and orientation introduced during manufacturing processes. Surprisingly, the Applicant has found that when about 34 to 40 weight percent of a polyphenylene ether is mixed with about 66 to 60 percent by weight of a polystyrene, an optically isotropic blend may be obtained whose zero birefringence is not substantially altered or affected by processing into the optical device or component.

The invention will be illustrated with the following specific example.

EXAMPLE

A polymeric blend was made with poly 2,6-dimethyl phenylene oxide (PPO) and polystyrene with the molecular weight of about 100,000. The blend contained about 38% by weight PPO and 62% by weight polystyrene. The blend was mixed with chloroform in the ratio of 95% by weight chloroform and 5% by weight blend. The solution was cast into a film about 20 microns thick on a glass substrate. The film was allowed to dry in vacuum maintained at 100° C. for about 2 days. After the chloroform has been completely dried from the film, the film was removed from the glass substrate by peeling. The separated film was then clamped between two clamps and a load of $5 \times 10^5$ dynes/cm$^2$ applied to one clamp while the film was heated to 150° C., resulting in a 90% elongation of the film. The film was then cool to ambient temperature and examined by optical and infrared technique for optical birefringence and molecular orientation. The optical birefringence of the sample was found to be zero while infrared analysis showed that the molecular species in the samples were oriented as shown by the differences in absorbence of radiation polarized in different directions.

As indicated above, although it is known that the PPO and polystyrene are completely miscible in all proportions, it was not known that specific mixtures of these two polymers would form optically isotropic blends. The complete miscibility insured uniformity and opical clarity by eliminating scattering from phase separated domains. Unexpectedly, the Applicant has found that within the relatively narrow range of about 34 to 40 weight percent PPO mixed with about 60 to 66 weight percent of polystyrene, the resultant blend has zero or substantially zero birefringence. The zero birefringence for the mixture of PPO and polystyrene is not obtained in other proportions. Although birefringence is observed in blends of PPO and the polystyrene having ratios of polymers different than that indicated above, the birefringence is negative in blends containing less PPO and positive in blends containing much more PPO. Surprisingly, it has been found that the zero birefringent property of the proper blend of PPO-polystyrene is not substantially affected when the blend is processed into an optical device or component. Although the Applicant does not wish to be bound by any particular theoritical explanation, it is believed that the PPO and polystyrene form an interacting entanglement network in a manner that the orientation of one molecular species is proportional to the orientation of the other molecular species, at various levels of stressing applied to the blend. It is believed that this property of the blend insures that the optical properties of the blend will remain essentially constant through various stresses applied to the blend in the manufacturing processes.

When mixing the two polymers to obtain the zero birefringent blend, the relative proportions of each polymer to be used depends on the precise nature of the polymers employed. For example, when polystyrene is used, the amount of PPO required to obtain zero birefringent blend depends on the molecular weight of the polystyrene. Thus, with polystyrene having an average molecular weight of about 670,000, about 38 to 40 percent by weight of PPO in the blend is required. With polystyrene having a preferred average molecular weight of about 100,000 to about 300,000, about 36 to 40 weight percent of PPO is desired. For a polystyrene having an average molecular weight of about 100,000 to 110,000, about 37 to 39 weight percent PPO is needed. And with a polystyrene having an average molecular weight of about 10,000 about 31 to 33 weight percent PPO is needed. When using polystyrene of molecular weight of less than 100,000, somewhat less PPO is to be used to obtain zero birefringent blend.

It is to be understood that while the above discussion has been directed particularly to PPO and polystyrene, substituted polymers also may be used in the blend of the present invention. For example, in place of PPO, the following polymers may be used instead: poly (2,6-diethyl-1.4-phenylene oxide); poly (2-methyl, 6-ethyl-1,4-phenylene oxide); poly (2-methyl, 6-propyl-1,4 phenylene oxide); poly (2,6-dipropyl-1,4-phenylene oxide); and poly (2-ethyl, 6-propyl-1,4-phenylene oxide). Similarly, in place of polystyrene, poly (2-methyl-styrene) or poly (p-chlorostyrene-co-o-chlorostyrene) may be used. When substituted polymers are used, the relative proportions in the blend may need to be adjusted to points outside the ranges mentioned above in order to obtain zero birefringence.

While the invention has been described in detail in reference to specific and preferred embodiments, it will be appreciated that various modifications may be made from the specific details without departing from the spirit and scope of the invention.

What is claimed is:

1. An optical recording member for optically recording and retrieving of information thereon, said member having at least one optically isotropic layer made of an optically isotropic polymeric material which is a blend of at least two polymers, said two polymers being completely miscible at least over a range of relative proportions, said two polymers having opposite anisotropies, and the optically isotropic polymeric material having substantially zero birefringence which is not substantially changed by processing of said material into said layer.

2. An optical recording member according to claim 1 in which said two polymers are a polyphenylene ether and a polystyrene.

3. An optical recording member according to claim 2 in which the polyphenylene ether is poly 2,6-dimethyl phenylene oxide, and in which the polystyrene is polystyrene having a molecular weight between about 100,000 and about 300,000.

4. An optical recording member according to claim 3 in which the poly 2,6-dimethyl phenylene oxide is present in an amount about 36 to 40 percent by weight of the blend, and in which the polystyrene is present in an amount about 60 to 64 percent by weight of the blend.

5. An optical recording member according to claim 4 in which the poly 2,6-dimethyl phenylene oxide is present in an amount about 38 percent by weight of the blend, and in which the polystyrene has a molecular weight about 100,000 and is present in an amount about 62 percent by weight of the blend.

* * * * *